US005461677A

United States Patent [19]

Raj et al.

[11] Patent Number: 5,461,677

[45] Date of Patent: Oct. 24, 1995

[54] LOUDSPEAKER

[75] Inventors: Kuldip Raj, Merrimack; James Bonvouloir, Nashua; Ronald Moskowitz, Hollis, all of N.H.

[73] Assignee: Ferrofluidics Corporation, Nashua, N.H.

[21] Appl. No.: 285,772

[22] Filed: Aug. 3, 1994

Related U.S. Application Data

[63] Continuation of Ser. No. 122,902, Sep. 16, 1993, abandoned.

[51] Int. Cl.[6] .................... H04R 25/00

[52] U.S. Cl. .................... 381/199; 381/194; 381/192; 381/201

[58] Field of Search .................... 381/199, 194, 381/205, 188, 192, 198, 201; 181/199

[56] References Cited

U.S. PATENT DOCUMENTS 4,492,827 1/1985 Shintaku .................... 381/199

5,062,140 10/1991 Inanaga et al. .................... 381/201

*Primary Examiner*—Curtis Kuntz
*Assistant Examiner*—Sinh Tran
*Attorney, Agent, or Firm*—Bookstein & Kudirka

[57] ABSTRACT

A loudspeaker including one or more secondary magnets positioned proximate to an opening of a gap through which a voice coil moves, to capture escaping ferrofluid and return the fluid to the gap. The secondary magnets have axial poles and are oriented, relative to a speaker magnet, to enhance the radial magnetic flux within the gap and to diminish the flux of a fringe field axially adjacent to the gap. When ferrofluid escapes from the gap, it is captured and held by one of the secondary magnets at a distal edge, which is a position of relatively high flux density within the magnetic field of the secondary magnet. When the amount of fluid held by the secondary magnet forms a sufficiently large miniscus, additional fluid captured by the magnet flows to a second region of relatively high flux density in the field of the secondary magnet and is drawn into the voice coil gap.

7 Claims, 6 Drawing Sheets

LOUDSPEAKER

This application is a continuation of patent application Ser. No. 08/122,902, filed Sep. 16, 1993, and now abandoned.

FIELD OF INVENTION

The invention relates generally to loudspeakers which utilize magnetic fluids in gaps surrounding voice coils and, more particularly, to mechanisms for retaining the magnetic fluids within the gaps.

BACKGROUND

Conventional loudspeakers produce audible sounds by displacing air via the movement of a diaphragm. Specifically, the diaphragm is attached to and moves under the control of a voice coil, through which electric currents associated with the sounds to be reproduced are driven. The voice coil is disposed in an annular air gap of a magnetic structure. This structure includes a permanent magnet that provides radial flux in the air gap. Current through the coil interacts with this flux to provide axial forces on the coil and thereby displace the coil and attached diaphragm in accordance with the instantaneous magnitude and direction of the current.

For a number of years, the air gaps in some loudspeakers have been filled with magnetic fluids, sometimes referred to as "ferrofluids." These ferrofluids, which contain suspended magnetic particles, transfer heat from the voice coil and also provide damping for the movement of the coil, thereby reducing distortion in the speaker and smoothing its frequency response. For further explanation, see W. Bottenberg, L. Melillo and K. Raj, "The Dependence of Loudspeaker Design Parameters on the Properties of Magnetic Fluids," *Journal of Audio Engineering Society,* Volume 28, January/February 1980, pp. 17–25. The ferrofluids are particularly useful in speakers that move their voice coils relatively large distances, such as woofers and sub-woofers which respond to low frequencies. See, for example, L. Melillo and K. Raj, "Ferrofluids as a Means of Controlling Woofer Design Parameters," *Journal of Audio Engineering Society,* Volume 29, No. 3, 1981 March pp. 132–139.

To obtain the advantages discussed in the two articles cited above, the ferrofluid should remain in the voice coil air gap, rather than flowing out of the gap during voice coil excursions. The ferrofluid is attracted by the magnetic field in the gap and is drawn into the gap to form a ring between the voice coil and the respective walls of the magnetic structure. The ferrofluid is held in place by the magnetic field, and thus, resists flowing out of the gap. During large voice coil excursions, ferrofluid adhering to the voice coil is carried out of the gap and beyond the magnetic field region. The ferrofluid may be removed from the voice coil by acceleration forces, and thus, splash on nearby components.

The gap is connected to a cavity between the speaker magnet and various components of the magnetic structure and because the ferrofluid acts like an O-ring seal between the voice coil and the magnetic structure the cavity is essentially sealed. As the voice coil moves, it tends to elevate the air pressure within this cavity. If this pressure builds up to a point where it exceeds the pressure capacity of the ferrofluid O-ring seal, the air bursts through the seal and relatively large amounts of the ferrofluid may then be blown or flow out of the gap.

The build up of air pressure in the cavity is affected by the pumping action of the voice coil and the air temperature within the cavity. This pressure build up is alleviated somewhat by venting the cavity, if the vents are large enough. Vents tend to handle the pressure well for speakers in which the movements of the voice coil are relatively small, such as speakers with low excursion, low- to mid-frequency drivers. However, the vents do not as readily handle the pressure associated with the larger voice coil movements in large size woofer or sub-woofer speakers.

SUMMARY OF THE INVENTION

A loudspeaker constructed in accordance with the invention includes, in addition to the speaker magnet, a secondary magnet which is positioned proximate to the opening in the voice coil air gap to capture and return ferrofluid flowing out of the gap. In a first embodiment, the secondary magnet is annular and sized such that its inner diameter is slightly greater than the outer diameter of the gap. The secondary magnet has axial poles, and is oriented in the "bucking mode," i.e., with its poles facing like poles of the speaker magnet. The flux density of the magnetic field generated within the gap by the speaker magnet is thus enhanced by that of the secondary magnet, while the flux density of an axially adjacent fringe field is diminished. Ferrofluid flowing from the gap is attracted to and captured by the secondary magnet. The fluid is then essentially drawn back into the gap by the enhanced magnetic field therein.

Specifically, the escaping ferrofluid is attracted to the position of highest flux density in the magnetic field of the secondary magnet, which is the distal edge of the magnet. The magnet then holds the fluid at this edge and the fluid forms a miniscus. When the miniscus is sufficiently large, the magnet can no longer hold additional fluid attracted to the distal edge. This additional ferrofluid therefore flows from the distal edge toward a region of next greatest flux density, which is along the proximal edge of the magnet. As the fluid flows closer to the adjacent gap opening, it is drawn into the gap by the enhanced magnetic flux therein.

In a second embodiment, the secondary magnet has an outer diameter which is slightly less than the inner diameter of the voice coil gap. It sits on top of a central pole piece, which is part of the magnetic structure. The axial poles of the secondary magnet are oriented such that the magnetic flux of the secondary magnet enhances that of the permanent magnet within the gap and diminishes the fringe flux. If the pole piece is vented, the secondary magnet is annular. Otherwise, it may be a solid cylinder.

In a third embodiment, both of the secondary magnets described above are utilized.

DESCRIPTION OF THE DRAWINGS

The above and further advantages of the invention may be better understood by referring to the following description in conjunction with the accompanying drawings, in which.

DETAILED DESCRIPTION

Figure 1A:
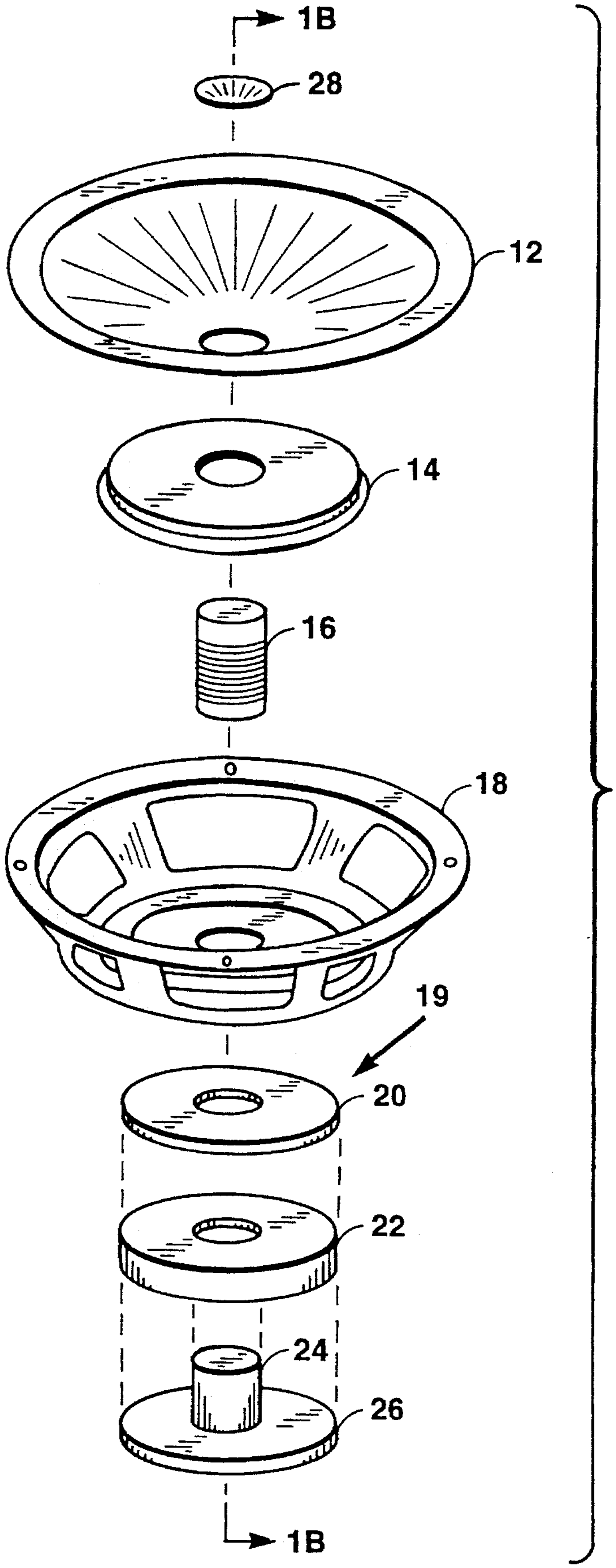
Fig. 1A PRIOR ART
FIG. 1A is an exploded view of a conventional loudspeaker.

FIG. 1A is an exploded view of a conventional loudspeaker 10. The speaker consists of a deflectable cone, or diaphragm, 12, which is controlled by the movements of a voice coil 16. The voice coil 16 moves as current flowing through the coil interacts with the magnetic flux of speaker magnet 22. Specifically, an annular magnetic structure 19 consisting of a top plate 20, a central pole piece 24 and a bottom plate 26 complete a magnetic circuit for a speaker magnet 22 to project flux from the magnet 22 across an annular air gap 25 (FIG. 1B) between the plate 20 and the pole piece 24. The voice coil 16, which is disposed in this annular structure, is displaced when current through the coil interacts with this radial flux to provide axial forces on the coil. The coil then moves the attached diaphragm 12 to produce sound. A frame, or "basket," 18 supports the magnetic assembly 19 and the diaphragm 12, as well as a spider 14 which maintains the central position of the coil 16. A dust cap 28 fits over a hole in the center of the diaphragm to prevent dust from entering the gap 25.

Figure 1B:
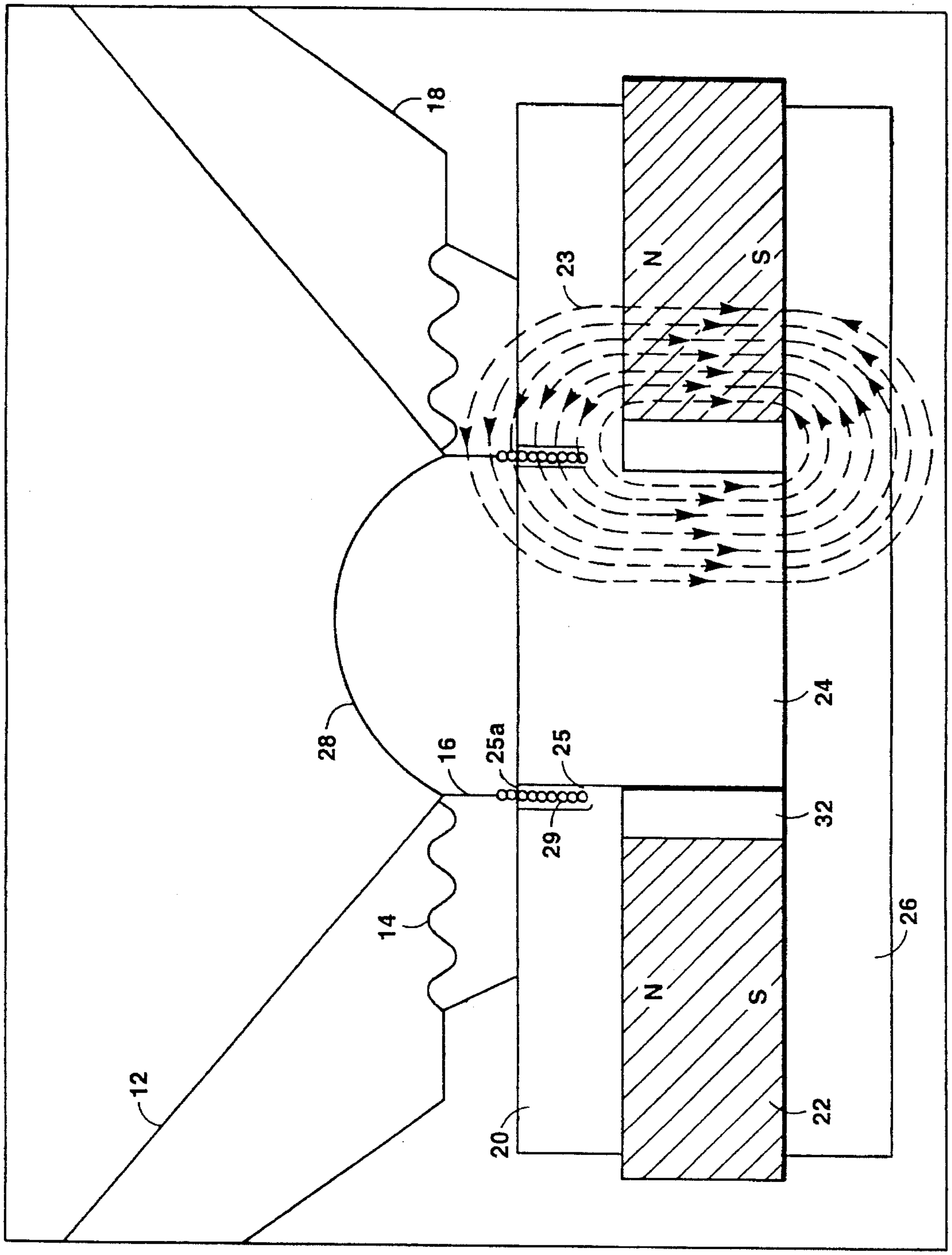
Fig. 1B PRIOR ART
FIG. 1B is a cross-sectional view of the loudspeaker of FIG. 1A.

FIG. 1B is a cross-sectional view of the speaker 10 along line b—b of FIG. 1A. The flux of the magnet 22 is illustrated by the dashed lines 23. The voice coil gap 25 is filled with a ferrofluid 29, which essentially forms an O-ring seal between the pole piece 24 and the top plate 20. This ferrofluid 29 promotes heat transfer frown the voice coil 16 to the plate 20 and damps of the movement of the voice coil.

The voice coil air gap 25 connects to a cavity 32 between the magnet 22, the pole piece 24, the bottom plate 26 and the top plate 20. As the coil 16 moves toward the bottom plate 26, air pressure builds up in the cavity 32. This pressure build up is also affected by the temperature within the cavity, such that the pressure increases as the temperature rises. If the air pressure in the gap 25 builds up to a point where it exceeds the seal capacity of the ferrofluid 29, it causes the seal to burst and the ferrofluid may then splash out of the gap 25 through gap opening **25*a***. This bursting is particularly likely to occur during long voice coil excursions.

To reduce the pressure within the cavity 32, it is typically vented. For example, bottom piece 26 may include one or more vents (not shown). These vents adequately handle pressure build up associated with relatively small movements of the voice coil 16. However, the vents may not be large enough to handle the rapid and large pressure build up associated with the large voice coil movements which occur in large size woofer and sub-woofer speakers. Accordingly, as the voice coil in such a speaker moves, the ferrofluid can be blown out of the voice coil gap 25 through opening **25*a* and splash onto the spider 14 and/or the pole piece 24**.

Even if the seal remains intact, thin layers of ferrofluid 29 adhere to the voice coil 16 and move with the voice coil out of the gap 25. During long excursions, the voice coil moves the adhering ferrofluid out of the magnetic field region of the speaker magnet 22. Acceleration forces then tend to remove the ferrofluid from the voice coil, and the ferrofluid splashes onto the pole piece 24, top plate 20 and/or the spider 14.

Figure 2:
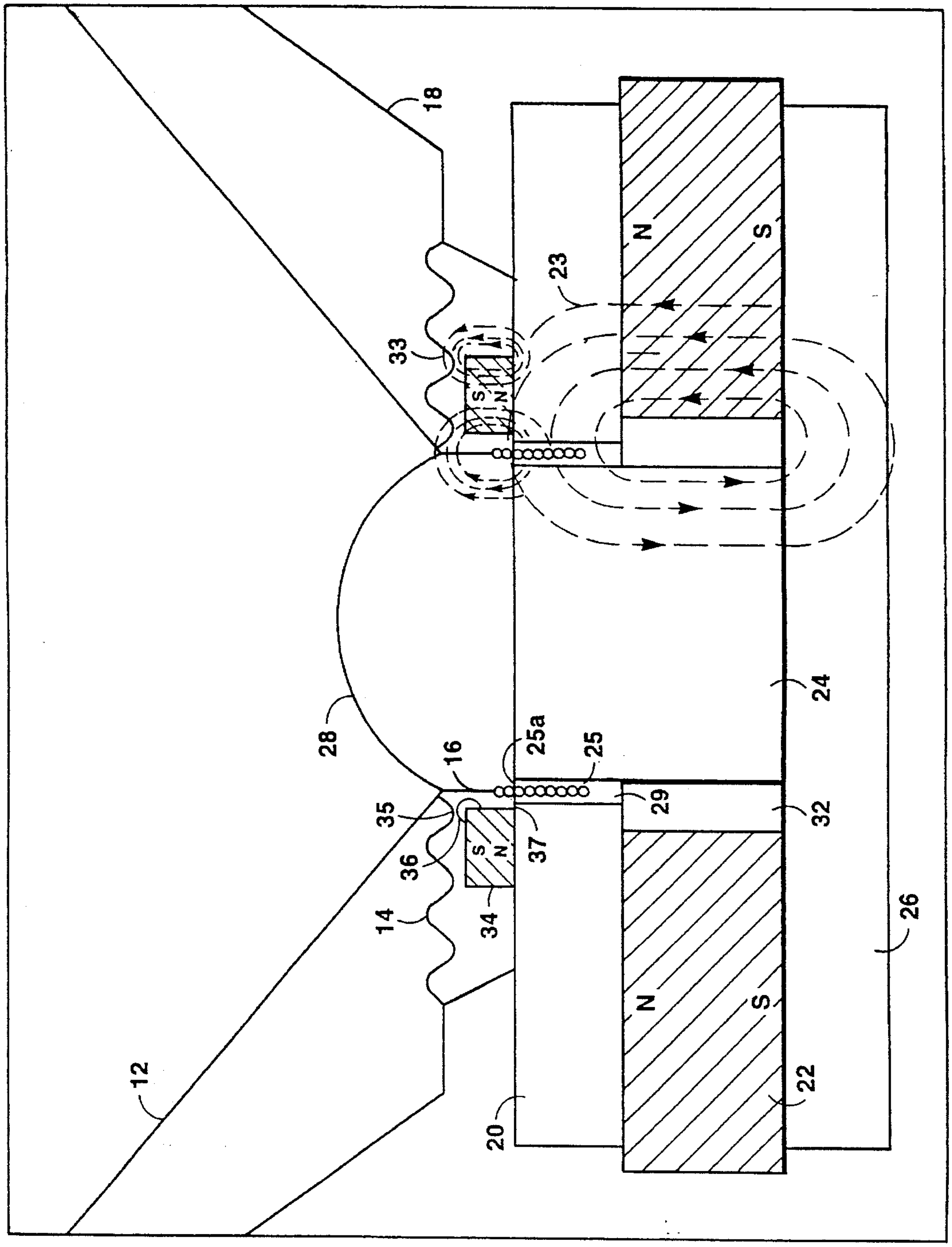
FIG. 2 is a cross-sectional view of a loudspeaker constructed in accordance with a first embodiment of the current invention.

To alleviate the problem of ferrofluid splashing, attributable to a bursting seal and/or to fluid pulled from the voice coil during long excursions, we have added all annular secondary magnet 34 to the speaker, as depicted in FIG. 2. The inner diameter of the magnet 34 is slightly greater than the outer diameter of the gap 25 at the opening **25*a*, and the length of the magnet 34 is approximately equal to the maximum range of movement of the voice coil 16 above the gap 25. The secondary magnet 34, like the speaker magnet 22, has axial poles. It is oriented relative to the speaker magnet such that like poles face each other, i.e., in the "bucking mode." In this orientation, the magnetic flux of the secondary magnet within the voice coil gap 25 is in the same radial direction as the flux of the speaker magnet, as illustrated by arrows 33**. Accordingly, the flux density within the upper portion of the gap is enhanced, while the flux density in an adjacent fringe field is diminished.

Referring still to FIG. 2, when ferrofluid 29 splashes over the top plate 20, it is attracted to the distal edge 36 of the secondary magnet 34. The ferrofluid thus forms a miniscus 35 at this edge. Once this miniscus 35 is sufficiently large, additional ferrofluid attracted to the magnet tends to run down to the proximal edge 37 of the magnet toward a second region of relatively high flux density in the field of the secondary magnet. As the fluid flows toward this proximal edge 37, it comes under the influence of the enhanced flux within the upper portion of the gap 25 and is drawn into the gap. In practice, an amount of ferrofluid sufficient to form the sufficiently large miniscus 35 is applied to the distal edge 36 of the secondary magnet 34, such that any fluid splashing from the gap 25 is immediately returned to the gap rather than held by the magnet 34.

Figure 3:
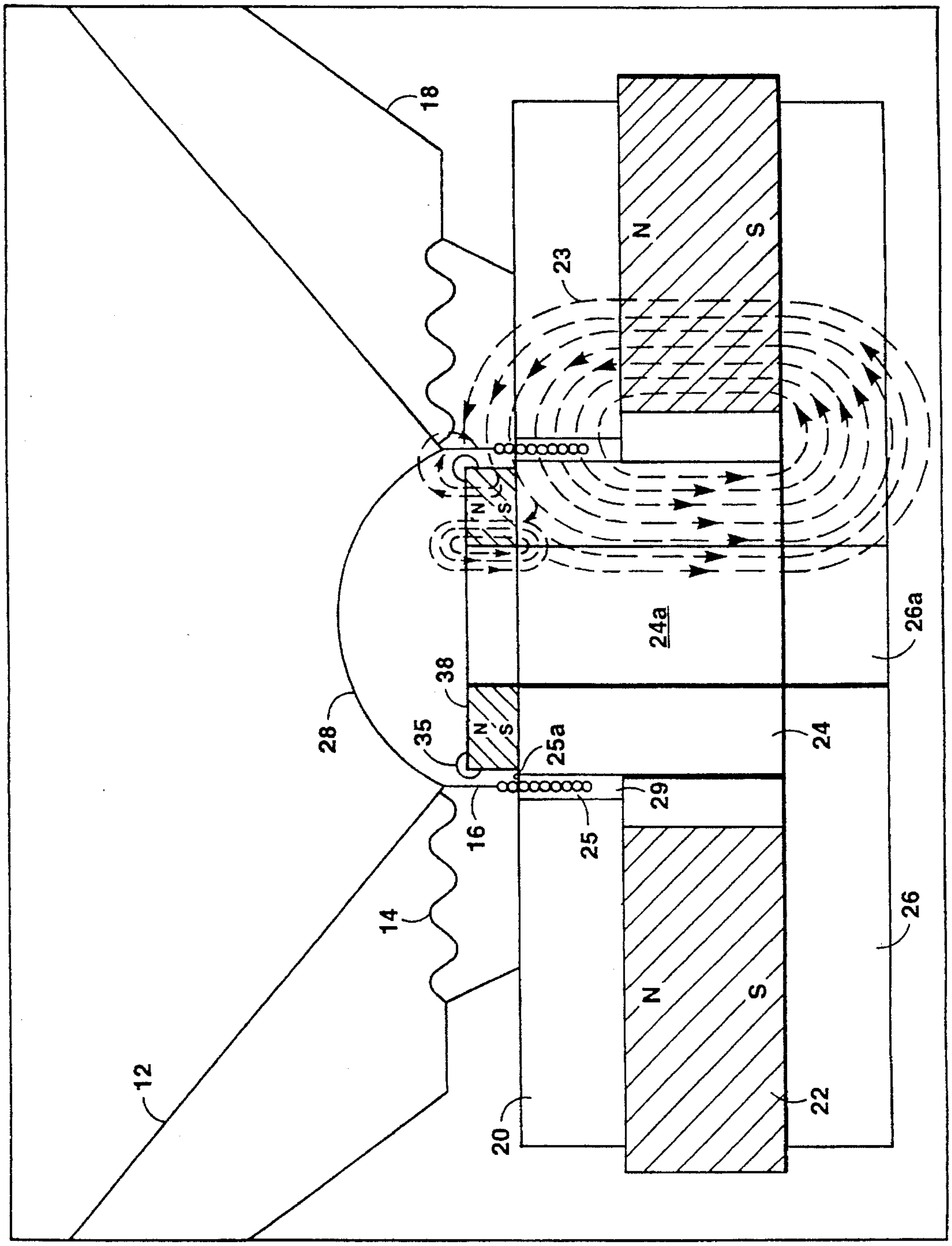
FIG. 3 is a cross-sectional view of a loudspeaker constructed in accordance with a second embodiment of the invention.

FIG. 3 illustrates a second embodiment of the invention. The speaker includes a cylindrical secondary magnet 38 with an outer diameter which is slightly less than the inner diameter of the voice coil gap 25 at the opening **25*a*. This magnet 38 is positioned on the top of the pole piece 24, proximate to the gap opening 25*a*. It has axial poles which are oriented, relative to the poles of the speaker magnet 22, such that the magnetic flux in the voice coil gap 25 is enhanced. The magnet 38 thus attracts ferrofluid flowing from the gap 25 through opening 25*a* over the pole piece 24, and returns the fluid to the gap as described above. If the pole piece 24 is vented to relieve pressure build up under the dust cap 28, as illustrated by vent 24*a* in this drawing, the secondary magnet 38** is annular.

Figure 4:
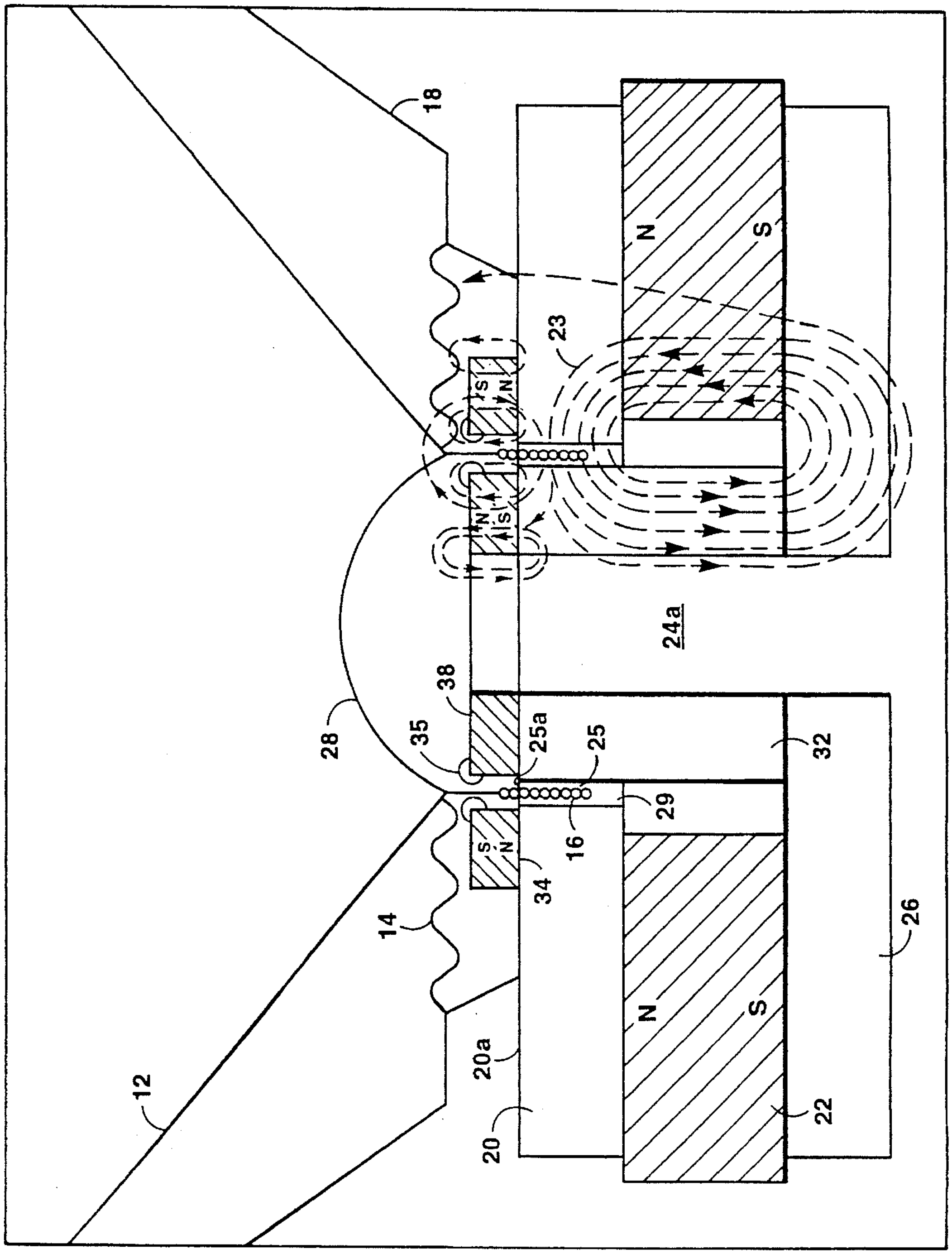
FIG. 4 is a cross-sectional view of a loudspeaker constructed in accordance with a third embodiment of the invention.

A third embodiment is depicted in FIG. 4. This speaker utilizes both of the secondary magnets 34 and 38 discussed above. The two secondary magnets each trap ferrofluid splashing out of the gap, with magnet 34 tending to attract fluid splashing over the top plate 20 and magnet 38 tending to attract fluid splashing over the pole piece 24.

Figure 5:
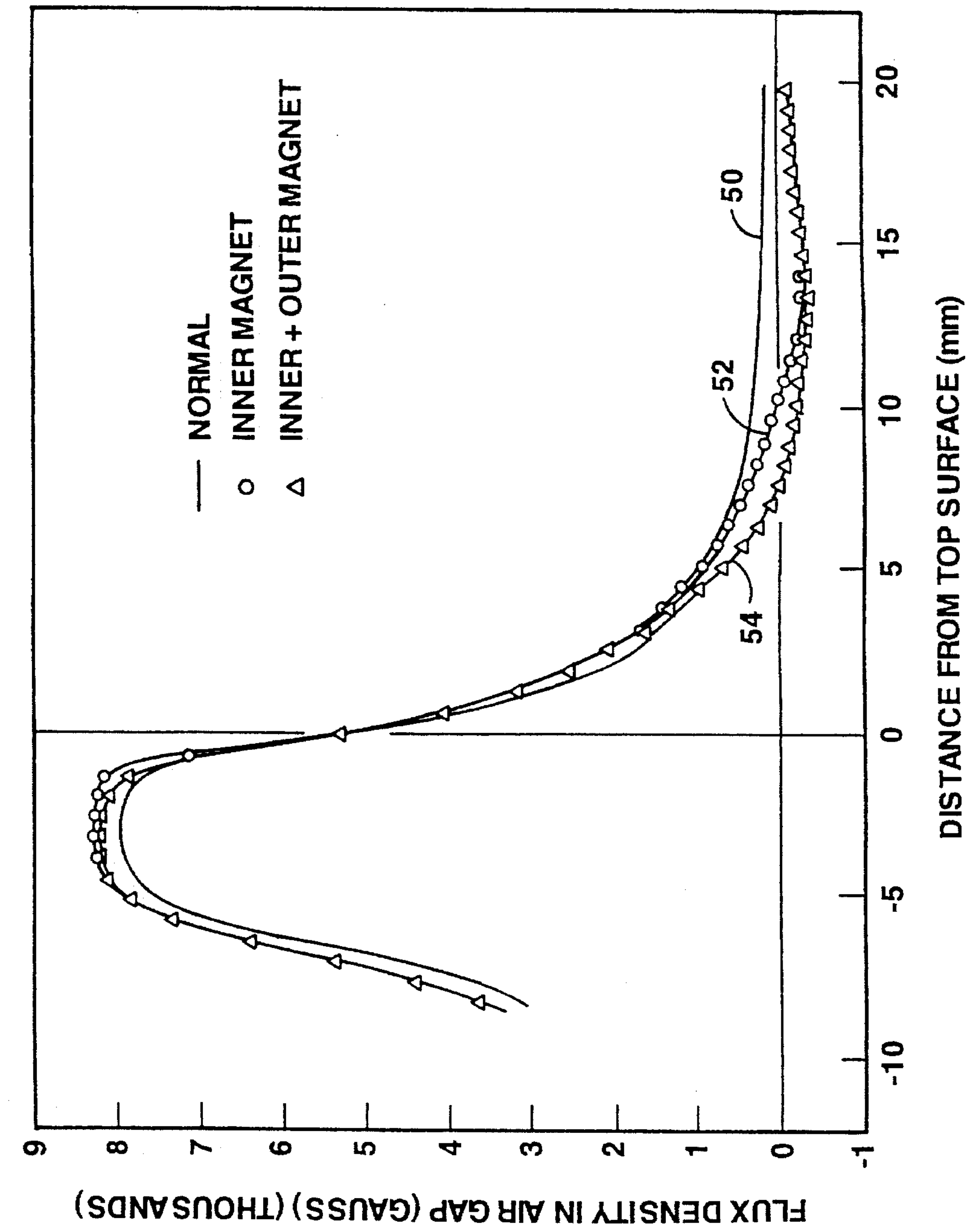
FIG. 5 is a graph of magnetic flux density versus distance from the opening of the top of the voice coil gap.

FIG. 5 is a graph of magnetic flux density in the voice coil gap 25 and immediately above the gap, verses distance from an outwardly facing surface **20*a* (FIG. 4) of the top plate 20. The zero point on the "x" axis represents the surface 20*a*. The positive numbers on the x-axis represent locations above this top surface and the negative numbers on the x-axis represent locations below the top surface, i.e., within the gap 25**.

The curve 50, which represents the flux density of the speaker magnet 22 (FIG. 1) without either of the secondary magnets, asymptotically approaches zero flux density with increasing distance from the gap and never changes direction. This means that the force on the ferrofluid, splashing either out of the gap 25 when the fluid seal bursts or off of the voice coil during long excursions, is weak and it thus does not tend to draw the ferrofluid back into the gap 25.

The curves 52 and 54 represent the flux densities associated, respectively, with speakers having one secondary magnet 38 and both secondary magnets 34 and 38. The first effect of these secondary magnets 34 and 38 is to increase the magnetic flux density in the air gap 25 at approximately the −5 mm location. A second effect is that the magnetic field of either or both of the secondary magnets becomes zero in the region of 7 to 9 mm from the surface of the top plate, and then reverses direction. The null point of the field is thus 1 to 2 mm below the distal edge 35 of each of the magnets. The magnetic field gradients at the distal edges of the secondary magnets, which are approximately 8 to 11 mm from the top surface 20*a* are several times higher than those of the speaker magnet 22 alone. Accordingly, each or both of the secondary magnets, as appropriate, collect escaping ferrofluid and accumulate the fluid at these edges. After sufficient amounts of the fluid have accumulated, excess fluid first flows down the inner edges of the magnets and is then pulled down toward the voice coil gap 25 by the magnetic force therein.

The dimensions of the secondary magnets are typically dictated by the confines of the spider and the diaphragm. Optimally, these magnets will have heights which correspond with the largest excursions of the voice coil. The magnetic field distributions are affected by the dimensions of the magnets, as well as by the strengths of the magnets. Accordingly the dimensions and strengths of the magnets are chosen to provide the desired modified flux distribution both within the gap and outside of the gap.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A loudspeaker for generating sound from an electrical current, the loudspeaker comprising:

A. a voice coil through which the current runs;

B. a pole piece assembly defining an annular gap in which the voice coil is located, the annular gap having an inner and an outer diameter;

C. a magnet for producing a magnetic filed in the annular gap, the magnetic field interacting with the current to produce a movement of the voice coil;

D. ferrofluid located in the annular gap and held in the annular gap by the magnetic field, the movement of the voice coil causing the ferrofluid to splash from the annular gap; and E. a secondary magnet with a diameter that is approximately the size of one of the inner diameter or the outer diameter of the annular gap and a length that approximates a maximum range of the movement of the voice coil, the secondary magnet being positioned outside of and proximate to an open end of the annular gap and poled relative to the magnet to modify the magnetic field in the annular gap, to capture ferrofluid splashed from the annular gap by the movement of the voice coil and to return the captured ferrofluid to the annular gap.

2. The loudspeaker of claim 1 wherein the secondary magnet generates a secondary magnetic field and wherein the magnetic field and the secondary magnetic field combine to produce a modified magnetic field with a flux density having higher gradients than the magnetic field at a distal edge of the secondary magnet and also at a location within the annular gap and near the open end of the annular gap.

3. The loudspeaker of claim 2 wherein the secondary magnet has a proximal edge and a local null of the modified magnetic field flux density occurs relatively close to the distal edge.

4. The loudspeaker of claim 3 wherein the secondary magnet includes at the distal edge a meniscus of ferrofluid which is as large as the secondary magnet can support at the distal edge.

5. A loudspeaker for generating sound from an electrical current, the loudspeaker comprising;

A. a voice coil through which the current runs the voice coil having an inside and an outside:

B. a pole piece assembly defining an annular gap in Which the voice coil is located, the annular gap having an inner and an outer diameter;

C. a magnet for producing a magnetic filed in the annular gap, the magnetic field interacting with the current to produce a movement of the voice coil;

D. ferrofluid located in the annular gap and held in the annular gap by the magnetic field, the movement of the voice coil causing the ferrofluid to splash from the annular gap; and E. a secondary magnet having a first secondary magnet part located proximate to the inside of the voice coil with a diameter that is approximately the size of the inner diameter of the annular gap and a length that approximates a maximum range of the movement of the voice coil, and a second secondary magnet part located proximate to the outside of the voice coil with a diameter that is approximately the size of the outer diameter of the annular gap and a length that approximates a maximum range of the movement of the voice coil, the first and second secondary magnet pads being positioned outside of and proximate to an open end of the annular gap and poled relative to the magnet to modify the magnetic field in the annular gap, to capture ferrofluid splashed from the annular gap by the movement of the voice coil one to return the captured ferrofluid to the annular gap.

6. A loudspeaker for generating sound from an electrical current, the loudspeaker comprising:

A. voice coil through which the current runs;

B. a magnet having an axial polarization;

C. a pole piece assembly defining an annular gap with an inner and an outer diameter, the gap having a long axis in which the voice coil is located, the pole piece assembly cooperating with the magnet to produce a radial magnetic field in the annular gap, the radial magnetic field interacting with the current to produce a movement of the voice coil within the annular gap in a direction along the long axis;

D. ferrofluid located in the annular gap and held in the annular gap by the magnetic field, the movement of the voice coil causing the ferrofluid to splash from the annular gap; and E. a secondary axially-polarized magnet with distal and proximal edges and having a diameter that is approximately the size of one of the inner diameter or the outer diameter of the annular gap and a length that approximates a maximum range of the movement of the voice coil, the secondary magnet being positioned outside of and proximate to an open end of the annular gap and poled oppositely to the magnet polarization to produce a secondary magnetic field, the magnetic field and the secondary magnetic field combining to produce a modified magnetic field having a higher flux density than the radial magnetic field within the annular gap and near an annular gap opening, a null point near the distal edge of the secondary magnet and a maximum flux density at the distal edge, to capture at the distal edge of the secondary magnet ferrofluid splashed from the annular gap by the movement of the voice coil and to return the captured ferrofluid to the annular gap.

7. A loudspeaker for generating sound from an electrical current, the loudspeaker comprising;

A. voice coil through which the current runs, the voice coil having an inside and an outside;

B. a magnet having an axial polarization;

C. a pole piece assembly defining an annular gap with an inner and an outer diameter, the gap having a long axis in which the voice coil is located, the pole piece assembly cooperating with the magnet to produce a radial magnetic field in the annular gap the radial magnetic field interacting with the current to produce a movement of the voice coil within the annular gap in a direction along the long axis;

D. ferrofluid located in the annular gap and held in the annular gap by the magnetic field, the movement of the voice coil causing the ferrofluid to splash from the annular gap; and E. a secondary axially-polarized magnet with distal and proximal edges, the secondary magnet comprising a first secondary magnet part located proximate to the inside of the voice coil and having a diameter that is approximately the size of the inner diameter of the annular gap and a length that approximates a maximum range of the movement of the voice coil, and a secondary magnet part located proximate to the outside of the voice coil, the secondary magnet having a diameter that is approximately the size of the outer diameter of the annular gap and a length that approximates a maximum range of the movement of the voice coil, the first and second secondary magnet parts being positioned outside of and proximate to an open end of the annular gap and poled oppositely to the magnet polarization to produce a secondary magnetic field, the radial magnetic field and the secondary magnetic field combining to produce a modified magnetic field having a higher flux density than the radial magnetic field within the annular gap and near an annular gap opening, a null point near the distal edge of the magnet and a secondary maximum flux density at the distal edge, to capture at the distal edge of the secondary magnet ferrofluid splashed from the annular gap by the movement of the voice coil and to return the captured ferrofluid to the annular gap.

* * * * *